Feb. 28, 1928.
G. H. BUCHANAN
1,660,667
METHOD OF SEPARATING CYANIDES FROM MIXTURES
Filed July 8, 1924
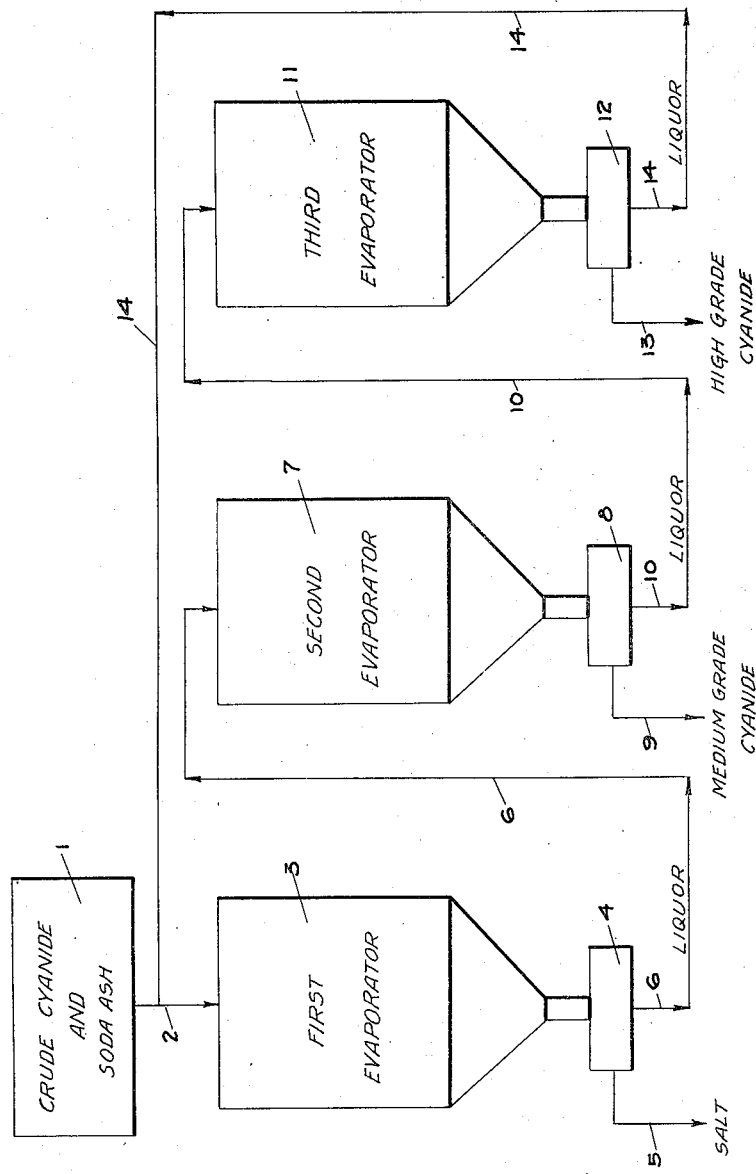
GUY H. BUCHANAN.
INVENTOR.
BY *[signature]*
ATTORNEY Patented Feb. 28, 1928.

1,660,667

UNITED STATES PATENT OFFICE.

GUY H. BUCHANAN, OF WESTFIELD, NEW JERSEY, ASSIGNOR TO AMERICAN CYANAMID COMPANY, OF NEW YORK, N. Y., A CORPORATION OF MAINE.

METHOD OF SEPARATING CYANIDES FROM MIXTURES.

Application filed July 8, 1924. Serial No. 724,808.

This invention relates to the production of high grade cyanide, more particularly to the separation of a cyanide from a mixture with other salts.

In the production of cyanides by the fusion of lime nitrogen and sodium chloride the product consists of a mixture of the cyanides and chlorides of sodium and calcium together with graphitic carbon and other impurities introduced with the raw materials used. This product may be dissolved in water and the calcium precipitated by the addition of a suitable salt, such as sodium carbonate or sodium sulfate. On filtering the mixture there is obtained a solution of sodium chloride and sodium cyanide from which it is desirable to obtain a product containing a high percentage of sodium cyanide.

It is, therefore, among the objects of this invention to provide a means for obtaining a high grade cyanide from a solution containing a cyanide and a chloride.

It is a further object of my invention to provide a method of separation of a cyanide from other salts which shall be efficient and semi-automatic in its operation.

I have discovered that when a solution containing say two parts of sodium cyanide to one part of sodium chloride is evaporated in vacuo, the sodium chloride precipitates out first, but in coming down carries with it sodium cyanide in the amounts shown in the following table.

| NaCl removed. % original. | NaCN carried down. % original. |
|---|---|
| 10 | 1. |
| 20 | 1.7 |
| 30 | 2.4 |
| 40 | 3.1 |
| 50 | 3.8 |
| 60 | 4.5 |
| 70 | 10.0 |
| 80 | 15.0 |
| 90 | 22.0 |
| 95 | 55.0 |

In order, therefore, to prepare a high grade sodium cyanide from such a solution I have found it desirable to proceed as follows:

I concentrate the solution of sodium cyanide and chloride in vacuo until approximately 50% of the chloride has been precipitated, the salt carrying down with it approximately 4% of the original cyanide. I then filter and obtain a low grade cyanide-chloride product containing approximately 14% NaCN. I concentrate the mother liquor further, carrying the concentration this time until 40% more of the original chloride has been precipitated. This second salt will carry down with it an additional 18% of the cyanide, making 22% in all. On filtering I obtain a medium grade product containing approximately 47% NaCn. In the two products thus far produced I have removed 22% of the cyanide and 90% of the salt, consequently the mother liquor from the medium grade product should contain 78% of the original cyanide and 10% of the original chloride. The ratio of cyanide to chloride in this mother liquor should be 1.56 to .1, that is, 2 x .78 to 1 x .10, provided no decomposition of the cyanide took place during the evaporation treatment. I have found, however, that under controlled conditions losses of this character can be kept below 2%, consequently on evaporating the last named mother liquor to dryness to obtain a high grade product, I find that the percentage of sodium cyanide in the product will be approximately 2% lower than would be indicated by the ratio 1.56 to 0.10. That is instead of securing a final product containing 94% NaCN, the final product will contain approximately 92% NaCN.

The distribution of the three grades of cyanide produced are substantially as follows:

|   | Per cent of total product. |
|---|---|
| Low grade | 20 |
| Medium grade | 25 |
| High grade | 55 |

It will be noted that the complete separation of the sodium cyanide from the chloride is not feasible commercially. The reason for this is probably that the two salts are isomorphous and that a definite relation exists between the cyanide and the chloride in the crystals and the mother liquor.

In the accompanying drawing constituting a part thereof, the single figure is a diagrammatic view of a system adapted to the practice of my invention.

In the container 1 I provide a mixture of a crude cyanide, such as that formed by the fusion of calcium cyanamide and common salt in a well-known manner, with a substance such as soda ash in water. The resulting solution, which contains sodium cyanide and sodium chloride together with minor amounts of other substances, is passed through pipe 2 into evaporator 3, where low temperature evaporation in vacuo takes place, the salt 5 being separated from the liquor in filter 4 and removed therefrom in any desired manner. The liquor is conducted through pipe 6 to the second evaporator 7, where a further crystallization of salt takes place. Generally the salt in evaporator 7 carries down with it a relatively large proportion of cyanide so that it has useful properties in the arts. This mixture 9 is separated from the liquor by filter 8 and is removed therefrom and used for various purposes, such as a case hardening material for metal articles. The liquor is conducted through pipe 10 into the third evaporator where crystallization takes place to produce a high grade cyanide containing a small amount of chloride, the material 13 being filtered at 12 and removed for use. The mother liquor is conducted through pipe 14 to pipe 2 and goes through the cycle once more with the addition of fresh solution from container 1.

The low grade material 5 may be returned to the cyanide furnaces and used in treating more calcium cyanamid for the production of crude cyanide. The medium grade material 9 may be used as a case hardener in the treatment of iron and steel, and the high grade material 13 may be used in those arts and industries, as for example, in electroplating, where a high grade cyanide is desired.

It will be obvious that many variations of my process are possible. That is, instead of removing sufficient crystals to effect a separation of 50% of the sodium chloride in the first operation, I may combine the first and second operations and thereby remove 90% of the salt in one operation. Or if I desire to produce a material containing more than 92% cyanide, I may make one or more preliminary separations so as to remove more than 90% of the salt, say 95% of the salt, leaving thereby less salt in the mother liquor to contaminate my final product. I may so vary the procedure as to obtain products of different grades but I generally attempt to obtain a high grade cyanide containing at least 75% sodium cyanide and preferably about 90% or more.

Altho I have described my invention setting forth a specific material to which my process is applicable, the invention is not limited thereto. For instance, I may produce the mixture of cyanide and chloride in any other manner than by the transformation of cyanamid to cyanide. Other halides than the chloride may be used and other alkali and alkali earth metals may be substituted for the sodium and calcium mentioned above.

What I claim is:

1. A method of separating the cyanide from the chloride in a mixture containing an alkali metal cyanide and chloride which comprises concentrating a solution thereof to precipitate at least 50 per cent of the chloride, filtering and repeating the operation.

2. A method of separating the cyanide from the chloride in a mixture containing sodium cyanide and chloride which comprises evaporating a solution thereof until about 50% of the chloride present is precipitated.

3. A method of separating the cyanide from the chloride in a mixture containing sodium cyanide and chloride which comprises evaporating a solution thereof until about 50% of the chloride present is precipitated, removing the chloride and again evaporating the solution until about 40% more of the chloride is precipitated.

4. A method of separating the cyanide from the chloride in a mixture containing sodium cyanide and chloride which comprises evaporating a solution thereof until about 50% of the chloride present is precipitated, removing the chloride and again evaporating the solution until about 40% more of the chloride is precipitated, removing the chloride and evaporating the mother liquor.

5. A method of separating the cyanide from the chloride in a mixture containing sodium cyanide and chloride which comprises evaporating a solution thereof to precipitate a sufficient amount of chloride so that the remaining material in solution contains over 75% of cyanide, removing the chloride and evaporating the solution.

6. A method of separating the cyanide from the chloride in a mixture containing sodium cyanide and chloride which comprises evaporating a solution thereof to precipitate a sufficient amount of chloride so that the remaining material in solution contains over 90% of cyanide, removing the chloride and evaporating the solution.

In testimony whereof, I have hereunto subscribed my name this 30 day of June, 1924.

GUY H. BUCHANAN.